(12) United States Patent
Chai et al.

(10) Patent No.: US 10,146,635 B1
(45) Date of Patent: Dec. 4, 2018

(54) VIRTUAL MACHINE BACKUP

(71) Applicant: EMC Corporation, Hopkinton, MA (US)

(72) Inventors: Mu Chai, Bellevue, WA (US); Vladimir Mandic, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 309 days.

(21) Appl. No.: 14/755,066

(22) Filed: Jun. 30, 2015

(51) Int. Cl.
| | |
|---|---|
| *G06F 17/00* | (2006.01) |
| *G06F 11/14* | (2006.01) |
| *G06F 9/455* | (2018.01) |
| *G06F 17/30* | (2006.01) |

(52) U.S. Cl.
CPC ...... *G06F 11/1458* (2013.01); *G06F 9/45558* (2013.01); *G06F 17/30371* (2013.01); *G06F 2009/45579* (2013.01); *G06F 2009/45583* (2013.01); *G06F 2201/84* (2013.01)

(58) Field of Classification Search
CPC ......... G06F 17/30371; G06F 17/30315; G06F 17/30; G06F 11/1458
USPC .................................................. 707/600–899
See application file for complete search history.

(56) References Cited

U.S. PATENT DOCUMENTS

| | | | | |
|---|---|---|---|---|
| 9,804,929 B2 * | 10/2017 | Karinta | ............... | G06F 11/1451 |
| 2009/0228671 A1 * | 9/2009 | Shigemura | .......... | G06F 11/1466 |
| | | | | 711/162 |
| 2012/0084258 A1 * | 4/2012 | Karonde | ............. | G06F 11/1461 |
| | | | | 707/641 |

* cited by examiner

*Primary Examiner* — Isaac M Woo
(74) *Attorney, Agent, or Firm* — Dergosits & Noah LLP; Todd A. Noah

(57) ABSTRACT

A virtual machine (VM) is disclosed. The VM includes a virtual processor including a plurality of applications, a volume shadow copy service (VSS) controller and an intelligent application requester that is configured to discover an application in the plurality of applications. The discovered application requires VSS supported backup and needs to be monitored for disk input/output (I/O) from a time a backup operation of the application is initiated till the back operation ends. The VM also includes a software component configured to monitor the disk I/O related to the application. The software component is configured to interface with the VSS controller to effectuate VSS supported backup of the application. The VM includes a control interface to enable an external software to control the intelligent application requester.

21 Claims, 4 Drawing Sheets

VIRTUAL MACHINE BACKUP

BACKGROUND

Virtualization techniques have been in practice for a long time in the development of hardware and software systems. Generally speaking, virtualization techniques aim to abstract underlying resources and to provide abstract interfaces. A virtual machine (VM) is a software emulation of a computer system. A VM typically functions as a computer system in which applications can be installed and used just as they can be installed in a conventional computer system. The VM is executed in a virtual machine runtime environment that provides an interface to mimic the hardware components such as memory, ports, storage, etc. In the recent years, the use of virtual machines have increased substantially primarily due to a wider adoption of cloud computing. Virtual machines can be used to provide a fluid and on-demand scalable computing infrastructure.

Among many others, a virtual machine provides a feature of making a point in time copy of the virtual machine in which a snapshot of the entire virtual computer is taken. This snapshot can be used to launch the virtual machine later. The snapshot is basically a computer file which when executed in the virtual machine runtime environment spawns a virtual machine in the state the virtual machine was when the snapshot was taken. In a computing environment, there may be a large number of virtual machine which may need to be backed up through the process of point in time snapshots at regular intervals.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Virtual machine infrastructure provides an important and useful feature of taking snapshots of a virtual hard drive (VDD) at a given point of time. Generally speaking, the VDD snapshot is a backup of the entire virtual machine (VM) including all applications installed in the virtual machine. During the process of taking a snapshot, applications installed in the virtual machine may still be running and may still be writing to the disk. For most applications, such continued write operations to the disk, even if disregarded, typically do not result in an inconsistent backup. However, in some other applications such as SQL Server, Exchange, etc., taking a snapshot and disregarding disk writes from the start of the process of taking snapshot to the end typically results in an inconsistent backup. Generally speaking, if a VM is spawned from an inconsistent snapshot or backup, the application (e.g., SQL Server) may not function or at the very least, may not function as desired.

One way to ensure proper application backup integrity is to shutdown such applications prior to initiating the process of taking a snapshot. However, in a data center including hundreds of virtual machines, this solution may not be practical, especially given the fact that the data center administrator will first need to identify all virtual machines that include at least one application that requires special handling. It would certainly be challenging to automate this process for regular periodic backups even for a smaller data center.

Storage management or backup software applications, such as Microsoft VSS, provide features to monitor running applications' disk I/O and creates a VSS snapshot inside the VM that is application consistent at the cost of additional processing power and time. Further, this solution works at the virtual machine level, hence taking a snapshot of a virtual machine takes longer and requires more processing resources. The problem becomes acute in larger data centers.

Various embodiments described herein provide solutions that produce integral and consistent backups or snapshots of a virtual machine only for applications that require such consistency, reducing the overall processing power and time.

Figure 1:
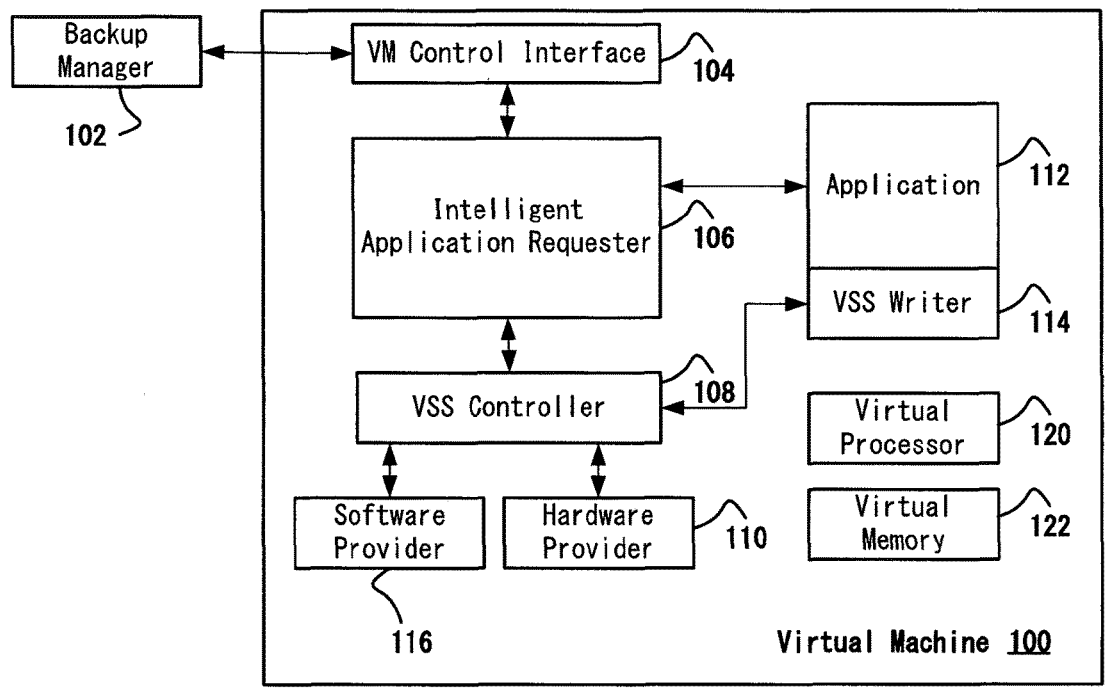
FIG. 1 is a schematic diagram illustrating a virtual machine including an intelligent application requester in accordance in one or more embodiments of the present disclosure.

FIG. 1 is a schematic diagram illustrating a virtual machine (VM) 100 including an intelligent application requester 106. It should be noted that the basic structure and operations of a virtual machine are well known in the art, therefore, a detailed description of a virtual machine is being omitted so as not to obfuscate the present disclosure.

The VM 100 may include a VM control interface 104 to enable an external component or system to perform housekeeping operations (such as backup) on the VM 100. One such external system could be a backup manager 102. An example of the backup manager 102 may be a backup and recovery software to create backups of one or more virtual machines at configurable intervals. The VM control interface 104 may also provide a user interface to enable a user to perform predefined actions on the VM 100. The VM 100 also includes a virtual processor 120 and a virtual memory 122. A virtual processor 120 is implemented in software and mimics the functionality of the underlying hardware processor.

In some embodiments, the VM control interface 104 allows injecting a user defined file or files (including executables) and application into the VM 100. The VM control interface 104 also enables executing scripts (such as batch files) that can be run before and/or after the VSS snapshot inside the VM is taken. The user defined files and scripts themselves could be injected by the backup manager 102. Those scripts can be called explicitly by the backup manager 102 before and/or after it the VSS snapshot is taken inside the VM 100. The scripts may also be called implicitly as part of the VM backup operation. Typically, the pre-script is called before the "freeze" event and the post-script is executed after the "thaw" event. The freeze is a period of time during the backup operation when a VSS writer 114 has flushed its writes to a volume and is not initiating additional writes. The thaw event is issued by a VSS controller 108 that a shadow copy freeze has completed. This event is typically used to remove the VSS writer's preparations for a freeze.

The VM 100 includes an application 112. Typically, the VM 100 may include a plurality of applications. The VM 100 may also include a volume shadow copy service (VSS)

controller 108. In one embodiment, the VSS controller 108 provides features for managing the VSS snapshot operation is inside the VM 100. The VM 100 may also include a VSS writer 114. The VSS writer 114 is customized for the application 112. For example, if the application 112 is SQL Server, a SQL Server writer would be an example of the VSS writer 114. In one example, the VSS writer 114 monitors disk input/output (I/O) of the application 112, especially during backup process. The VSS controller 108 typically initiates and oversees the snapshot creation process after being instructed to do so, as for example by the backup manager 102.

For some applications, a process of taking a snapshot cannot be achieved without completing all pending file change operations after the process of taking snapshot is initiated. Sometimes, it is necessary to complete a series of inter-related changes to several related files. For example, when a database application transfers a piece of data from one file to another, it needs to delete it from the source file and create it in the destination file. Hence, a snapshot must not be between the first deletion and the subsequent creation, or else it will be inconsistent and may not be useful. The snapshot must either be taken before the deletion or after the creation. Enforcing this semantic consistency is the duty of the VSS writer 114.

The VM 100 may also include a software provider 116 and a hardware provider 110. These are abstraction interfaces that expose underlying operating system and hardware resources and functionality. In some embodiments, the VM control interface 104 is configured to check if the intelligent application requester 106 is present in the VM 100 at the startup of the VM 100 and installs the intelligent application requester 106 if the intelligent application requester 106 is not found by in the VM 100.

Figure 2:
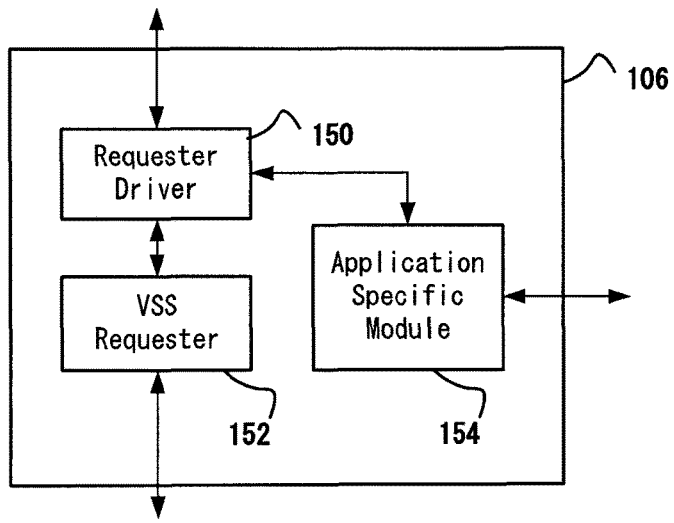
FIG. 2 illustrates a schematic diagram of the intelligent application requester, under an embodiment.

FIG. 2 illustrates a schematic diagram of the intelligent application requester 106. The intelligent application requester 106 includes a requester driver 150, a VSS requester 152 and an application specific module 154.

The requester driver 150 communicates with the VM control interface 104, the VSS requester 152 and the application specific module 154. In one example, the requester driver 150 is explicitly called by pre-scripts, post-scripts and "backup complete" event. The requester driver 150 also sends notification to the VM control interface 104 when the VSS requester 152 is about to take a snapshot so the VM control interface 104 can start a redo file or log. The redo file holds a group of change vectors representing changes made to the VM 100. General speaking, the redo log contains the change of the disk writes that take place between the time the VSS snapshot inside the VM 100 initiates and the time the snapshot of the VM 100 finishes.

The VSS requester 152 provides application discovery and application quiescing functionality. The VSS requester 152 is configured to identify applications that are needed to be specially handled (for example, requires VSS supported backup) during the backup process. In one example, a configuration file with a list of applications that require special handling is associated with the VSS requester 152. The VSS requester 152 may also be configured to quiesce the applications that need special handling. During quiescing, the disk operations that were in process are allowed to be completed but new operations are denied.

The application specific module 154 provides additional operations that are required by the application 112 for proper backup. Typically, these additional operations (such as SQL and Exchange log truncations if the application 112 is SQL Server or Microsoft Exchange) are not offered by the VSS controller 108 for all applications and all backup types. The application specific module 154 also offers events such as a Pre_Freeze_Operation event, a Post_Thaw_Operation event and a Post_Backup_Complete_Operation event. The Pre_Freeze_Operation event implements a user defined step or steps (e.g., shutting down the application 112 or one or more of the components of the application 112) for the application 112 before the VSS snapshot is taken. The App_Backup_Complete_Operation event implements a user defined step or steps for the application 112 after the VM backup is finished.

In some embodiments, the intelligent application requester 106 may also include a configuration file containing application authentication information to enable the intelligent application requester 106 to access the application 112 if the application 112 is protected by an authorization and authentication mechanism.

As noted above, the intelligent application requester 106 runs in the VM 100 and automatically discovers or identifies applications that need to be backed up using VSS supported backup process to maintain backup consistency. Therefore, when, for example, a VSS supported backup is initiated, only those previously identified applications are put through the VSS supported backup process, thus saving significant time and processing power, and allowing user to specify a backup policy for all VMs instead of having to configure each individual VM based on their application installations. In one example, the user may stipulate a policy that only SQL DBMS backups require application consistency, in such an embodiment, only the VMs that have SQL DBMS installed will need VSS snapshot inside the VMs, reducing unnecessary processing power and time for VMs that do not have SQL DBMS installed.

Figure 5:
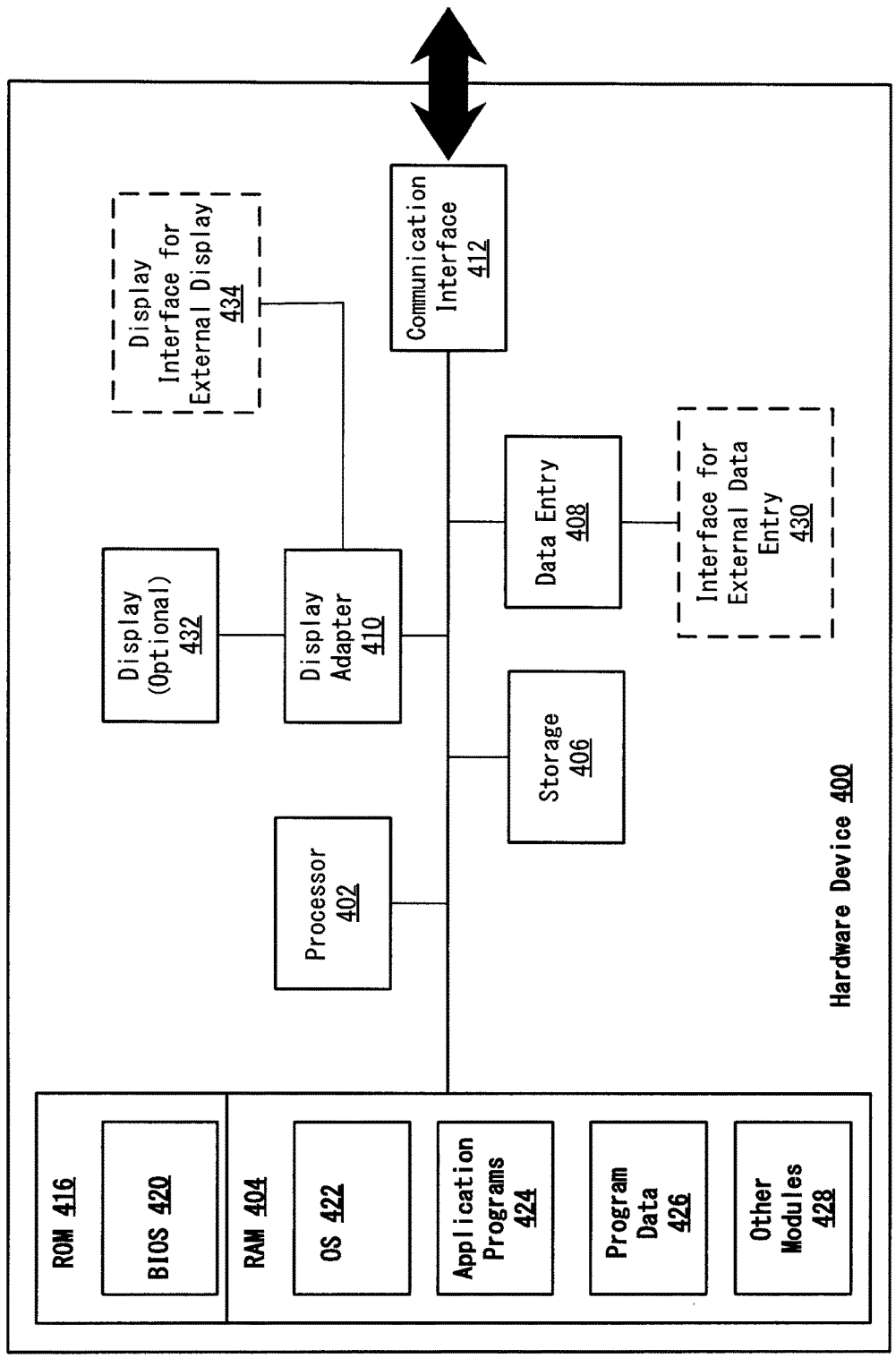
FIG. 5 is a block diagram illustrating an example hardware device in which the subject matter may be implemented.

FIG. 5 illustrates a flow diagram 200 of the functioning of the intelligent application requester 106 in accordance with one or more embodiments. Accordingly, at step 202, the intelligent application requester 106 searches for applications that need VSS supported backup. At decision step 204, if no application that needs VSS supported backup is found, the intelligent application requester 206 saves this information in a configuration storage (e.g., a configuration file) and at step 208 the process of the flow diagram 200 ends. In an embodiment, the application discovery process may be based on predefined configuration containing a list of applications that are pre-identified as requiring VSS supported backups. In some embodiments, the intelligent application requester 106 may also search in the VM 100 for installed VSS writers and include the applications associated with each of the installed VSS writers in the VSS supported backup operation.

If at decision step 204, however, one or more applications that need VSS supported backup are found, the intelligent application requester 106 loads an application specific VSS writer, for each found application. At step 212, the size of the VSS snapshot storage required is ascertained and the destination storage is checked for sufficient available storage capacity to hold the VSS snapshot. At step 214, the backup or snapshot is taken with the help of the VSS controller 108 and the VSS writer 114. At step 216, the information about found applications is preserved in a configuration. The VSS writer 114 files, snapshot identification and other user defined information are saved at a predefined or user defined location. Prior to storing this information, old information, if any, stored at the same location may be removed. At decision step 218, the backup or snapshot is verified to ascertain if the process of taking the snapshot was successful. If the verification fails, pertinent error messages are transmitted to the backup manager 102. Alternatively or in addition, the error message or messages may also be stored in an error file at a user or system defined location. If the backup process is successful, at optional step 222, transaction logs are truncated. Step 222 may be useful if the application is a database based application. At step 224, the process of flow diagram 200 ends.

In an embodiment, process 200 may be customized in that a configuration may specify a consistency level (e.g., crash consistency is required, file system consistency is required, application consistency, is required, or just enough consistency is required) and based on the required consistency level the intelligent application requester 106 may selectively perform VSS operations or forego VSS operations.

Figure 3:
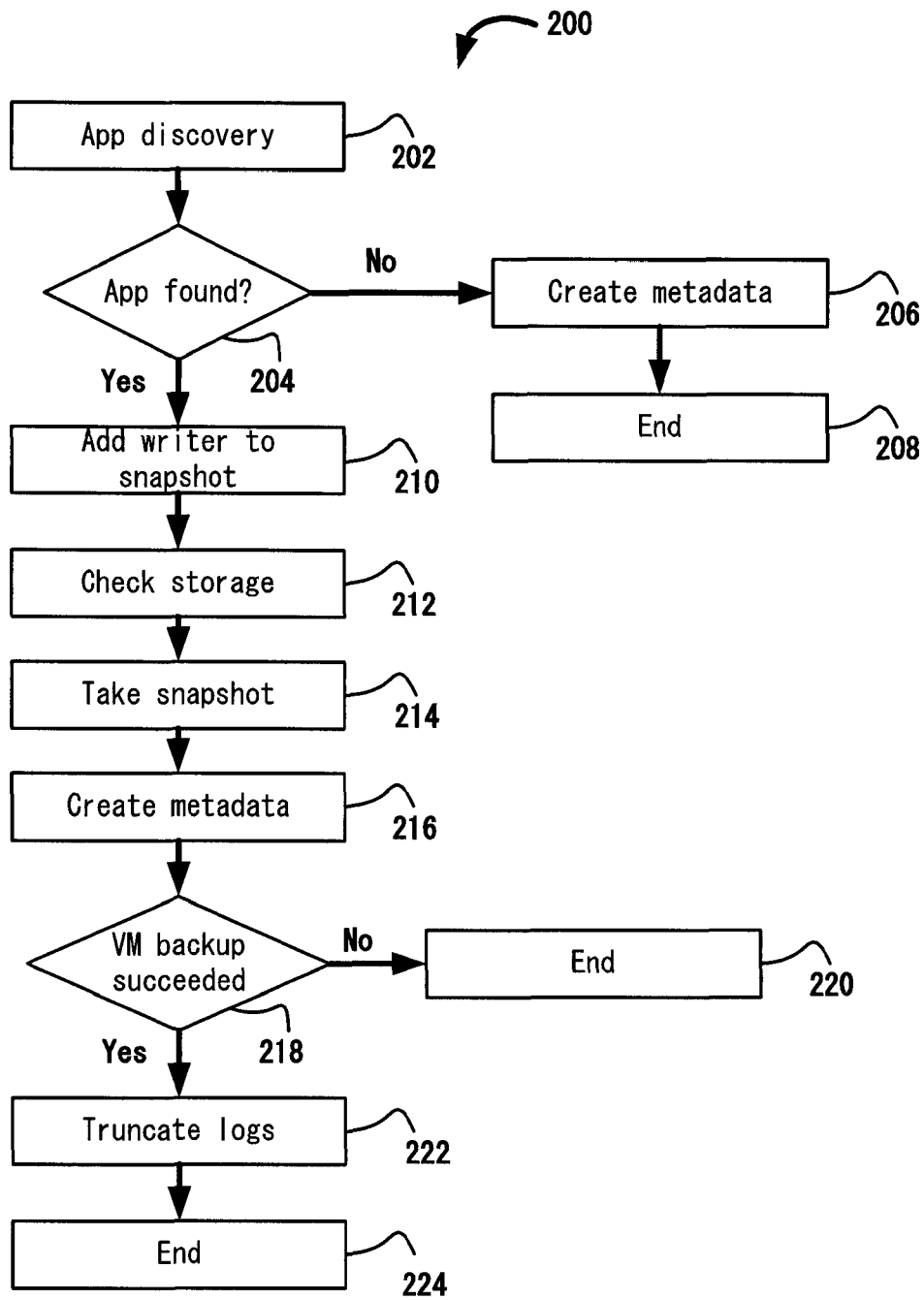
FIG. 3 illustrates a flow diagram of the functioning of the intelligent application requested, under an embodiment.

Although FIG. 3 depicts the blocks 202-224 occurring in a specific order, the blocks 202-224 may occur in another order. In other implementations, each of the blocks 202-224 may also be executed in combination with other blocks and/or some blocks may be divided into a different set of blocks.

Figure 4:
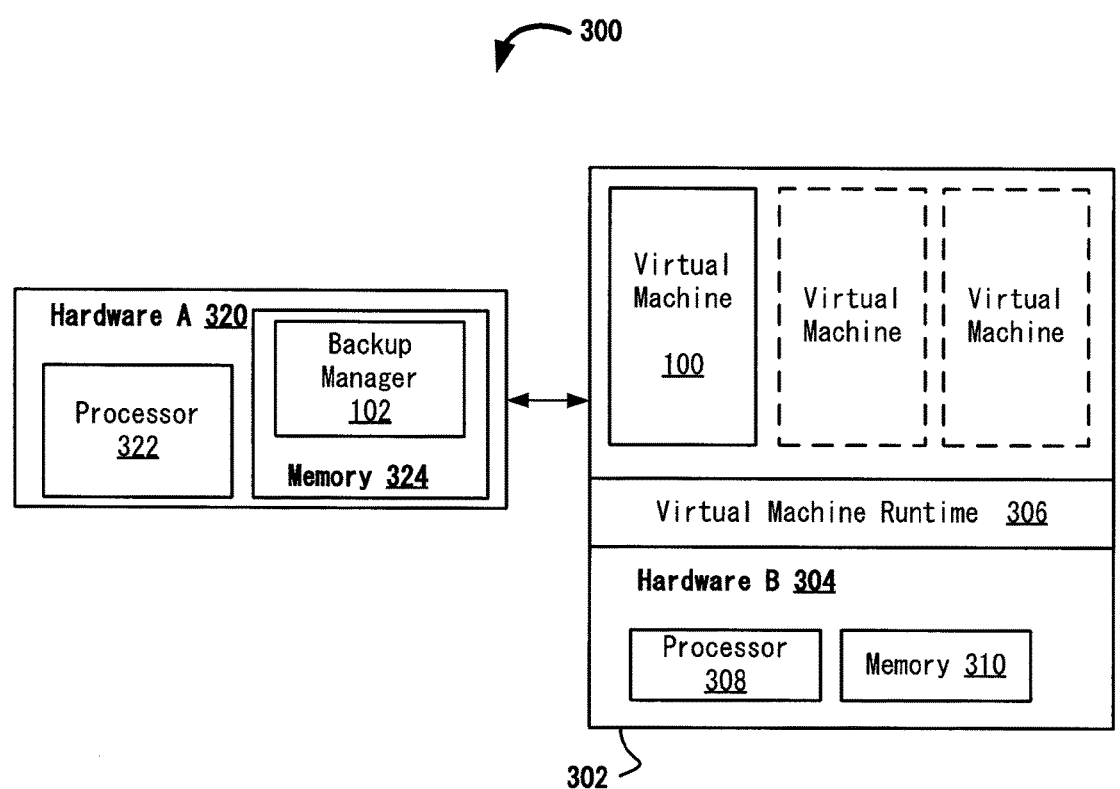
FIG. 4 is a block diagram illustrating a system including virtual machine runtime environment and backup application.

FIG. 4 illustrates a simplified block diagram depicting a system 300 for managing virtual machine snapshots and/or backups. The system 300 includes hardware A 320 that includes a processor 322 and a memory 324. The memory 324 includes the backup manager 102. Hardware A 320 is coupled to a computing system 302. The computing system 302 includes hardware B 304 which includes a processor 308 and a memory 310. The computing system 302 includes a virtual machine runtime 306. The examples of the virtual machine runtime 306 may be Hypervisor™, ESX™ and other similar products from other vendors. The virtual machine runtime 306 is configured to launch and manage one or more virtual machines 100. It should be noted that the system 300 may include a plurality of computing systems 302, each of them may be coupled to hardware A 320. In some embodiments, the system 300 does not include hardware A 320. In such embodiments, the backup manager 102 may be installed in one of the virtual machines in the computing system 302.

Having describing the subject matter in detail, an exemplary hardware device in which the subject matter may be implemented shall be described. Those of ordinary skill in the art will appreciate that the elements illustrated in FIG. 5 may vary depending on the system implementation. With reference to FIG. 5, an exemplary system for implementing the subject matter disclosed herein includes a hardware device 400, including a processing unit 402, memory 404, storage 406, a data entry module 408, a display adapter 410, a communication interface 412, and a bus 414 that couples the elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in the memory 404 and/or the storage 406 and/or received via the data entry module 308.

The memory 404 may include read only memory (ROM) 416 and random access memory (RAM) 418. The memory 404 may be configured to store program instructions and data during operation of the hardware device 400. In various embodiments, the memory 404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 404 may also include nonvolatile memory technologies such as nonvolatile flash RAM (NVRAM) or ROM. In some embodiments, it is contemplated that the memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in the ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 400.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 406, the ROM 416 or the RAM 418, including an operating system 422, one or more applications programs 444, program data 426, and other program modules 428. A user may enter commands and information into the hardware device 400 through the data entry module 408. The data entry module 408 may include mechanisms such as a keyboard, a touch screen, a pointing device, etc. Other external input devices (not shown) are connected to the hardware device 400 via an external data entry interface 430. By way of example and not limitation, external input devices may include a microphone, joystick, game pad, satellite dish, scanner, or the like. In some embodiments, external input devices may include video or audio input devices such as a video camera, a still camera, etc. The data entry module 408 may be configured to receive input from one or more users of the hardware device 400 and to deliver such input to the processing unit 402 and/or the memory 404 via the bus 414.

A display 432 is also connected to the bus 414 via the display adapter 410. The display 432 may be configured to display output of the hardware device 400 to one or more users. In some embodiments, a given device such as a touch screen, for example, may function as both the data entry module 408 and the display 432. External display devices may also be connected to the bus 414 via an external display interface 434. Other peripheral output devices, not shown, such as speakers and printers, may be connected to the hardware device 400.

The hardware device 400 may operate in a networked environment using logical connections to one or more remote nodes (not shown) via the communication interface 412. The remote node may be another computer, a server, a router, a peer device or other common network node, and typically includes many or all of the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 412 may include logic configured to support direct memory access (DMA) transfers between the memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 300 and other devices may be used.

It should be understood that the arrangement of the hardware device 400 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function).

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system comprising:
   a processor-based application, which when executed on a computer, will cause the processor to:
      identify at least one application of a plurality of applications in a virtual machine based on the at least one application requiring a volume shadow copy service (VSS) supported backup;
      initiate a backup operation of the at least one identified application;
      monitor the at least one identified application for disk input/output (I/O) between the initiation of the backup operation and the completion of the backup operation;
      associate a VSS writer with the at least one identified application;
      check disk storage of a destination for sufficient available storage capacity to hold a VSS snapshot;
      complete the backup operation of the at least one identified application using a VSS controller and the VSS writer by generating the VSS snapshot; and
      notify a VM control interface of the virtual machine that the VSS snapshot has been generated.

2. The system of claim 1, wherein the processor-based application when executed will further cause the processor to raise events during the backup operation and perform post backup pre-configured operations.

3. The system of claim 2, wherein the events include one or more of a Pre_Freeze_Operation event, a Post_Thaw_Operation even, a Post_Backup_Complete_Operation event and an App_Backup_Complete_Operation event.

4. The system of claim 2, wherein the events include an App_Backup_Complete_Operation event that is raised when a backup of the application is completed.

5. The system of claim 4, wherein the processor-based application when executed will further cause the processor to truncate database logs when the App_Backup_Complete_Operation event is raised if the application is a database system.

6. The system of claim 2, wherein the processor-based application when executed will further cause the processor to identify the at least one application using an application discovery service provided by a VSS requester.

7. The system of claim 2, wherein the processor-based application when executed will further cause the processor to store authentication information of the at least one application.

8. The system of claim 1, wherein the initiation of the backup operation is triggered by a call from an external interface through a control interface of the virtual machine.

9. The system of claim 1, wherein the processor-based application when executed will further cause the processor to check a configuration file to ascertain a required backup consistency level and perform the backup operation according to the selected consistency level.

10. A computer-implemented method for backing up an application in a virtual machine, the method being executed by a computer processor and comprising:
    identifying at least one application of a plurality of applications in a virtual machine based on the at least one application requiring a volume shadow copy service (VSS) supported backup;
    initiating a backup operation of the at least one identified application;
    monitoring the at least one identified application for disk input/output (I/O) between the initiation of the backup operation and the completion of the backup operation;
    associating a VSS writer with the at least one identified application;
    checking disk storage of a destination for sufficient available storage capacity to hold a VSS snapshot;
    completing the backup operation of the at least one identified application using a VSS controller and the VSS writer by generating the VSS snapshot; and
    notifying a VM control interface of the virtual machine that the VSS snapshot has been generated.

11. The method of claim 10, further includes raising events during the backup operation, the events include one or more of a Pre_Freeze_Operation event, a Post_Thaw_Operation even, a Post_Backup_Complete_Operation event and an App_Backup_Complete_Operation event.

12. The method of claim 11, further including truncating database logs when the App_Backup_Complete_Operation event is raised if the application is a database system.

13. The method of claim 10, wherein the initiating of the backup operation is triggered by a call from an external interface through a control interface of the virtual machine.

14. The method of claim 10, further including checking a configuration file to ascertain a required backup consistency level and performing the backup operation according to the selected consistency level.

15. A computer program product, comprising a non-transitory computer-readable medium having a computer-readable program code embodied therein to be executed by one or more processors, the program code including instructions to:
    identify at least one application of a plurality of applications in a virtual machine based on the at least one application requiring a volume shadow copy service (VSS) supported backup;
    initiate a backup operation of the at least one identified application;
    monitor the at least one identified application for disk input/output (I/O) between the initiation of the backup operation and the completion of the backup operation;
    associate a VSS writer with the at least one identified application;
    check disk storage of a destination for sufficient available storage capacity to hold a VSS snapshot;
    complete the backup operation of the at least one identified application using a VSS controller and the VSS writer by generating the VSS snapshot; and
    notify a VM control interface of the virtual machine that the VSS snapshot has been generated.

16. The computer program product of claim 15, wherein the program code includes further instructions to raise events during the backup operation and perform post backup pre-configured operations.

17. The computer program product of claim 16, wherein the, the events include one or more of a Pre_Freeze_Operation event, a Post_Thaw_Operation even, a Post_Backup_Complete_Operation event and an App_Backup_Complete_Operation event.

18. The computer program product of claim 16, wherein the program code includes further instructions to truncate database logs when the App_Backup_Complete_Operation event is raised if the application is a database system.

19. The computer program product of claim 15, wherein the initiating of the backup operation is triggered by a call from an external interface through a control interface of the virtual machine.

20. The computer program product of claim 15, wherein the program code includes further instructions to check a configuration file to ascertain a required backup consistency level and perform the backup operation according to the selected consistency level.

21. The computer program product of claim 15, wherein the program code includes further instructions to store authentication information of the application.

* * * * *